United States Patent
Goodwin et al.

(10) Patent No.: US 10,089,572 B2
(45) Date of Patent: Oct. 2, 2018

(54) RADIO FREQUENCY IDENTIFICATION TAG

(71) Applicant: HALLIBURTON ENERGY SERVICES, INC., Houston, TX (US)

(72) Inventors: Scott Goodwin, Chapel Hill, NC (US); Mark Roberson, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/536,080

(22) PCT Filed: Feb. 3, 2015

(86) PCT No.: PCT/US2015/014178
§ 371 (c)(1),
(2) Date: Jun. 14, 2017

(87) PCT Pub. No.: WO2016/126236
PCT Pub. Date: Aug. 11, 2016

(65) Prior Publication Data
US 2017/0344868 A1 Nov. 30, 2017

(51) Int. Cl.
*G06K 19/00* (2006.01)
*G06K 19/06* (2006.01)
*G06K 7/08* (2006.01)
*G06K 19/077* (2006.01)

(52) U.S. Cl.
CPC ..... *G06K 19/0775* (2013.01); *G06K 19/0772* (2013.01)

(58) Field of Classification Search
USPC .......................... 235/451, 487, 492, 375, 488
See application file for complete search history.

(56) References Cited

U.S. PATENT DOCUMENTS

| | | | |
|---|---|---|---|
| 8,072,332 B2* | 12/2011 | Forster | G06K 19/07749 340/572.3 |
| 2002/0017991 A1* | 2/2002 | Wuidart | G06K 7/0008 340/572.1 |
| 2005/0093677 A1* | 5/2005 | Forster | G06K 19/07749 340/10.1 |
| 2006/0054710 A1 | 3/2006 | Forster | |
| 2007/0024423 A1* | 2/2007 | Nikitin | G06K 19/0723 340/10.1 |

(Continued)

FOREIGN PATENT DOCUMENTS

WO 2013/156389 10/2013

OTHER PUBLICATIONS

PCT International Search Report and Written Opinion, dated Oct. 22, 2015, Appl No. PCT/US2015/014178, "Improved Radio Frequency Identification Tag", filed Feb. 3, 2015.

(Continued)

*Primary Examiner* — Tuyen K Vo
(74) *Attorney, Agent, or Firm* — Craig W. Roddy; Tumey L.L.P.

(57) ABSTRACT

A radio frequency identification (RFID) tag includes a substrate; and an inductive-capacitive circuit located on the substrate. The circuit includes a corrugated inductive antenna to communicate with a RFID interrogator using radio frequency signals. The circuit further includes a capacitor coupled to the corrugated inductive antenna.

18 Claims, 2 Drawing Sheets

(56) References Cited

U.S. PATENT DOCUMENTS

| | | | |
|---|---|---|---|
| 2008/0070003 A1* | 3/2008 | Nakatani | G06K 19/07749 |
| | | | 428/141 |
| 2009/0015412 A1 | 1/2009 | Clare et al. | |
| 2009/0295583 A1 | 12/2009 | Forster | |
| 2010/0032706 A1* | 2/2010 | Wang | H01L 33/38 |
| | | | 257/99 |
| 2010/0090013 A1 | 4/2010 | Jung et al. | |
| 2012/0018504 A1 | 1/2012 | Jiang et al. | |
| 2012/0235870 A1* | 9/2012 | Forster | H01Q 7/00 |
| | | | 343/728 |
| 2013/0075134 A1* | 3/2013 | Finn | H01P 11/00 |
| | | | 174/250 |
| 2013/0181573 A1* | 7/2013 | Hines | H04L 25/02 |
| | | | 310/313 R |
| 2014/0124582 A1* | 5/2014 | Kroener | G06K 19/07745 |
| | | | 235/487 |
| 2017/0249542 A1* | 8/2017 | Gabriel | G06K 19/0707 |

OTHER PUBLICATIONS

Australian Examination Report for Application No. 2015381870 dated May 22, 2018.

* cited by examiner

RADIO FREQUENCY IDENTIFICATION TAG

BACKGROUND

A radio-frequency identification (RFID) system uses RFID tags and interrogators. In order to interrogate a tag, an interrogator transmits an encoded radio signal to the tag. The tag receives the signal and responds with its ID signal, or code, that is stored in the tag. Because tags have unique ID signals, an interrogator can discriminate among several tags that might be within range. A tag can be either passive or active. An active tag includes a battery and periodically transmits its ID signal. A passive tag is cheaper and smaller than an active tag because a passive tag does not include a battery. Instead, a passive tag uses the radio energy transmitted by the interrogator in order to transmit its ID signal.

One popular format for an ID signal stored in a tag is a 96-bit string of data. The first eight bits are a header that identifies the version of the ID code format. The next 28 bits identify the organization that manages the data for the tag. The organization number may be assigned by a central body. The next 24 bits are an object class, identifying they type of object represented by the tag, and the last 36 bits are a unique number for a particular tag. As such, each tag has a unique ID signal.

The distance from which a tag can be read is called its read range. Read range depends on a number of factors, including the frequency of the radio waves used for communication and the power output of the interrogator. Some tags have a short read range that limits the applications in which these tags may be used.

BRIEF DESCRIPTION OF THE DRAWINGS

Accordingly, there are disclosed herein certain apparatuses for an improved radio frequency identification (RFID) tag. In the following detailed description of the various disclosed embodiments, reference will be made to the accompanying drawings in which.

Figure 1:
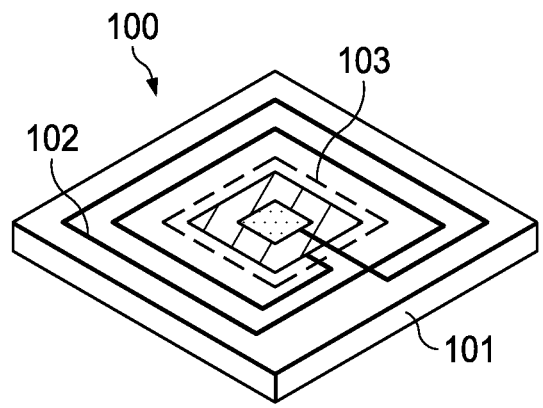
FIG. 1 is an isometric view of an illustrative radio frequency identification (RFID) tag including a corrugated inductive antenna.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The issues identified in the background are at least partly addressed by an improved RFID tag. FIG. 1 illustrates a RFID tag 100 including a substrate 101 and an inductive-capacitive circuit formed and located on the substrate 101. The substrate 101 may include an appropriate material such as a semi-conductive material, e.g., silicon, diamond, quartz, ceramic material, and the like. Many RFID tags 100 may be formed in an array on the same continuous portion of substrate 101 for ease of manufacturing after which the continuous portion of substrate 101 may be divided into separate portions, each separate portion containing one RFID tag.

As the tag 100 enters the interrogation region of an interrogator, the antennas of the tag and the interrogator may become inductively coupled, permitting the interrogator to transfer energy to the tag and the tag to communicate energy back to the interrogator via mutual inductance between the two antennas. In FIG. 1, tag 100 includes an antenna 102 and a capacitor 103 as part of a resonant, inductive-capacitive circuit. When the tag 100 is placed close enough to the interrogator, the field from the interrogator antenna couples to the inductive antenna 102 on the tag 100. A voltage is induced in the antenna 102 that powers the inductive-capacitive circuit. To enable data to be passed from the tag 100 to the interrogator, the inductive-capacitive circuit may change the load on the antenna 102, which can be detected by the reader due to the inductive coupling.

The capacitor 103 may have a fixed capacitance in one embodiment, but a variable capacitance in other embodiments. Additionally, the capacitor 103 may be implemented as two metal or poly-silicon layers separated by an oxide or other insulator.

The RFID tag 100 further includes an integrated circuit as part of the inductive-capacitive circuit. Powered by the voltage from antenna 102, the circuit modulates an impedance between the conductive layers of the capacitor 103, thereby generating a back-scattered signal for the interrogator to read.

To enhance the coupling of antenna 102 with the electromagnetic field from the interrogator, the antenna may be manufactured using conductor traces having a corrugated surface pattern. Typically, the skin depth associated with the interrogation signal frequencies is significantly less than the thickness of the conductor traces, causing the resistance of the traces to be governed in part by their surface area. Corrugations that increase the effective surface area of the traces are thus expected to reduce resistance while concurrently enhancing electromagnetic field line penetration into the bulk material of the conductor traces. Such corrugations may consequently enable weaker interrogation fields to nevertheless produce sufficiently strong antenna signals for communication with the RFID tag.

Figure 2:
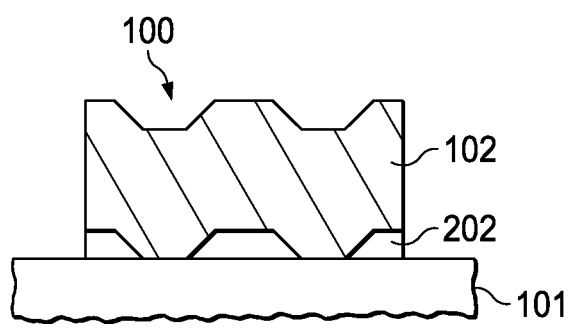
FIG. 2 is a cross-sectional view of an illustrative corrugated inductive antenna.

FIG. 2 illustrates a cross section of the corrugated inductive antenna 102 and substrate 101. The RFID tag 100 may include a corrugated layer 202 between the substrate 101 and the corrugated inductive antenna 102. In at least one embodiment, the corrugated layer 202 includes quartz while the corrugated inductive antenna 102 includes copper. A corrugation pattern of the corrugated layer 202 may create a corrugation pattern of the corrugated inductive antenna 102. Specifically, the corrugated layer 202 may include isolated lands or valleys that create mountains and valleys in the overlying corrugated inductive antenna. Additionally, portions of the substrate 101 may contact the corrugated inductive antenna 102, and portions of the substrate 101 may contact the corrugated layer 202. The corrugation pattern may be repeating, non-repeating, or random, and the corrugation pattern may be oriented in any direction with respect to the tag 100 and substrate 101 in various embodiments. The corrugated inductive antenna 102 provides more surface area than a non-corrugated antenna. As such, the read range of the tag 100 is increased.

Figure 3:
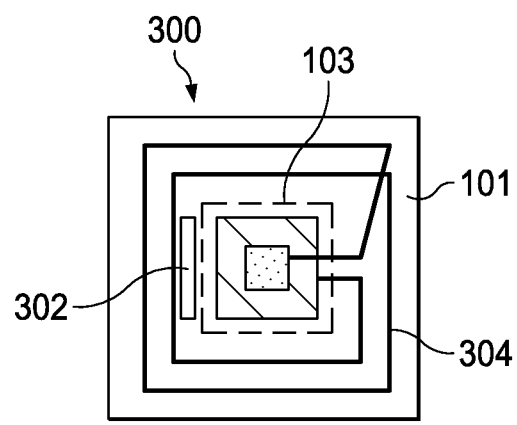
FIG. 3 is a top view of an illustrative RFID tag including a magnetic field concentration element.

FIG. 3 illustrates a radio frequency identification (RFID) tag 300 including a substrate 101 and an inductive-capacitive circuit formed and located on the substrate 101. The circuit includes an inductive antenna 304 to communicate with a RFID interrogator using radio frequency signals. The circuit also includes a capacitor 103 and an integrated control circuit coupled to the inductive antenna 102.

The tag 300 also includes one or more magnetic field concentration elements 302, formed and located on the substrate 101, that concentrate a magnetic field toward the inductive antenna 304. The magnetic field concentration 302 element may be ferromagnetic material, and it may be formed into any shape and/or orientation on the substrate 101. For example, as illustrated the magnetic field concentration element 302 is substantially rectangular, lies within the turns of the antenna 304, and includes iron.

The tag 300 may also include a magnetically anisotropic material having an anisotropy axis perpendicular to a surface of the RFID tag. The magnetically anisotropic material may be formed from a plurality of laminae of grain material having a particular orientation to preferentially steer electromagnetic field lines through the antenna loops. In at least some embodiments, the magnetically anisotropic material is formed by crushing and pulverizing ingots obtained by melting a suitable material, molding the resulting fine particles in a magnetic field, and then sintering. The magnetically anisotropic material may also be formed by using a topotactic reaction to transform an oriented but feeble magnetic material into a ferromagnetic material. By machining the anisotropic material from a larger portion of material, the anisotropy axis may be oriented in the desired direction.

Figure 4A:
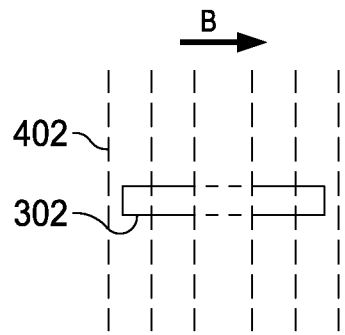
FIGS. 4A and 4B are a side view of an illustrative magnetic field concentration element.
Figure 4B:
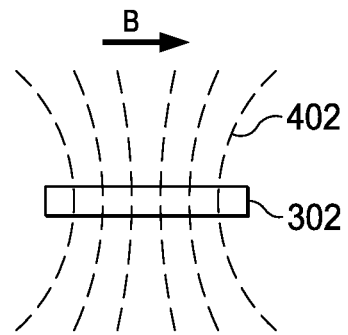

FIGS. 4A and 4B illustrate how the magnetic field concentration element 302 concentrates a magnetic field 402. As shown in FIG. 4A, a magnetic field 402 includes magnetic field lines that are parallel. The magnetic field lines illustrated are representative and not drawn to scale. As illustrated, four magnetic field lines would pass through an area occupied by a magnetic field concentration element 302 having an outline represented by a dashed line. Moving to FIG. 4B where the magnetic field concentration element 302 is in place within the magnetic field, the magnetic field concentration element 302 bends the magnetic field lines such that the magnetic field lines are no longer in parallel, and instead are concentrated by the element 302 into a smaller area. When placed on a RFID tag 300, as illustrated in FIG. 3, the magnetic field concentration element 302 also concentrates the magnetic field through the antenna loop on tag 300. By concentrating the magnetic field, element 302 enables the necessary antenna signal response to be achieved with a weaker electromagnetic field, thereby increasing the read range of the tag 300 illustrated in FIG. 3.

Figure 5:
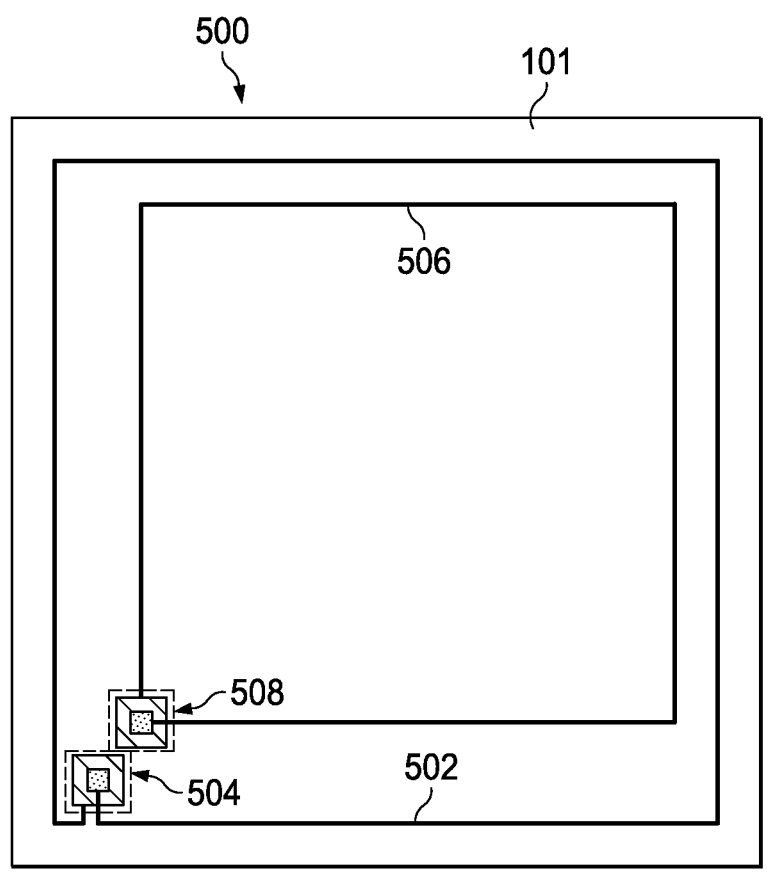
FIG. 5 is a top view of an illustrative RFID tag including two inductive-capacitive circuits.

FIG. 5 illustrates a RFID tag 500 including a substrate 101 including two inductive-capacitive circuits formed and located on the substrate 101. The first circuit includes a first inductive antenna 502 to communicate with a RFID interrogator using a radio frequency signal. The first circuit also includes a first capacitor 504 coupled to the first inductive antenna. The second circuit includes a second inductive antenna 506 that provides a radiated signal and a second capacitor 508 coupled to the second inductive antenna 506. The first and second inductive-capacitive circuits are cross-coupled by a parameter-sensitive interaction region, causing the radiated signal to depend at least in part on the radio frequency signal.

The cross-coupling may occur in several ways. In a first embodiment, the cross-coupling may be provided by an interaction region that lies between the first capacitor 504 and the second capacitor 508, such as a photosensitive material having a resistivity that varies based on light intensity, or a material with a temperature sensitive resistivity. In an alternative embodiment, the cross-coupling may be provided by an interaction region that lies between the first inductive antenna 502 and the second inductive antenna 506. In still other embodiments, the cross-coupling may be provided by an interaction region that lies both between the first inductive antenna 502 and the second inductive antenna 506 and between the first capacitor 504 and the second capacitor 508.

As illustrated, the circuits are nested, i.e. one lies substantially within another. However, the beneficial cross-coupling is not limited to a nested configuration. For example, in other embodiments, the first inductive-capacitive circuit is positioned on a first side of a substrate, and the second inductive-capacitive circuit is positioned on a second side of the substrate. Additionally, the first inductive-capacitive circuit and the second inductive-capacitive circuit may be positioned adjacently on a substrate.

The beneficial cross-coupling may broaden a frequency band in which the tag 500 responds to an interrogator. Additionally, the beneficial cross-coupling may vary as a function of a parameter, enabling the RFID interrogator to measure the parameter. For example, the parameter may be temperature, pressure, salinity, pH, chemical concentration, and the like, each of which can be enabled to modify the resistivity of a material in the interaction region. A smaller or larger cross-coupling may indicate a smaller or larger value for the parameter. By inducing cross-coupling within the tag 500, the interrogator is able to monitor one or more parameters in the fluid around the tag 500.

A radio frequency identification (RFID) tag includes a substrate; and an inductive-capacitive circuit located on the substrate. The circuit includes a corrugated inductive antenna to communicate with a RFID interrogator using radio frequency signals. The circuit further includes a capacitor coupled to the corrugated inductive antenna.

The RFID may include a corrugated layer between the substrate and the corrugated inductive antenna, and a corrugation pattern of the corrugated layer may create a corrugation pattern of the corrugated inductive antenna. Portions of the substrate may contact the corrugated inductive antenna, and portions of the substrate may contact the corrugated layer. The corrugated layer may include isolated lands or valleys. The corrugated layer may include quartz. The corrugated inductive antenna may include copper.

A radio frequency identification (RFID) tag includes a substrate and an inductive-capacitive circuit, located on the substrate. The circuit includes an inductive antenna to communicate with a RFID interrogator using radio frequency signals. The circuit also includes a capacitor coupled to the inductive antenna. The tag also includes one or more magnetic field concentration elements, located on the substrate, that concentrate a magnetic field toward the inductive antenna.

The magnetic field concentration element may be ferromagnetic. The magnetic field concentration element may include iron. The tag may also include a magnetically anisotropic material including an anisotropy axis perpendicular to a surface of the RFID tag.

A radio frequency identification (RFID) tag includes a substrate and a first inductive-capacitive circuit, located on the substrate. The first circuit includes a first inductive antenna to communicate with a RFID interrogator using a radio frequency signal. The first circuit also includes a first capacitor coupled to the first inductive antenna. The tag also includes a second inductive-capacitive circuit, located on the substrate. The second circuit includes a second inductive antenna that provides a radiated signal and a second capacitor coupled to the second inductive antenna. The first and second inductive-capacitive circuits are cross-coupled, causing the radiated signal to depend at least in part on the radio frequency signal.

The cross-coupling may be provided by an interaction region that lies between the first capacitor and the second capacitor. The cross-coupling may be provided by an interaction region that lies between the first inductive antenna and the second inductive antenna. The cross-coupling may be provided by an interaction region that lies both between the first inductive antenna and the second inductive antenna and between the first capacitor and the second capacitor. The first inductive-capacitive circuit may be positioned on a first side of a substrate, and the second inductive-capacitive circuit may be positioned on a second side of the substrate. The first inductive-capacitive circuit and the second inductive-capacitive circuit may be positioned adjacently on a substrate. The first inductive-capacitive circuit may be nested within the second inductive-capacitive circuit. The cross-coupling may broaden a frequency band in which the tag responds to the RFID interrogator. The cross-coupling may vary as a function of a parameter, enabling the RFID interrogator to measure the parameter. The parameter may be selected from the group consisting of temperature, pressure, salinity, pH, and chemical concentration.

While the present disclosure has been described with respect to a limited number of embodiments, those skilled in the art will appreciate numerous modifications and variations therefrom. It is intended that the appended claims cover all such modifications and variations.

What is claimed is:

1. A radio frequency identification (RFID) tag, comprising:
   a substrate;
   an inductive-capacitive circuit, located on the substrate, comprising:
      a corrugated inductive antenna to communicate with a RFID interrogator using radio frequency signals; and
      a capacitor coupled to the corrugated inductive antenna; and
   a corrugated layer between the substrate and the corrugated inductive antenna, wherein a corrugation pattern of the corrugated layer creates a corrugation pattern of the corrugated inductive antenna, wherein portions of the substrate contact the corrugated inductive antenna, and portions of the substrate contact the corrugated layer.

2. The RFID tag of claim 1, wherein the corrugated layer comprises isolated lands or valleys.

3. The RFID tag of claim 1, wherein the corrugated layer comprises quartz.

4. The RFID tag of claim 1, wherein the corrugated inductive antenna comprises copper.

5. A radio frequency identification (RFID) tag, comprising:
   a substrate; and
   an inductive-capacitive circuit, located on the substrate, comprising:
      an inductive antenna to communicate with a RFID interrogator using radio frequency signals; and
      a capacitor coupled to the inductive antenna;
   a corrugated layer between the substrate and the inductive antenna wherein corrugation pattern of the corrugated layer creates a corrugation pattern of the inductive antenna, wherein portions of substrate contact the inductive antenna, and portions of the substrate contact the corrugated layer; and
   one or more magnetic field concentration elements, located on the substrate, that concentrate a magnetic field toward the inductive antenna.

6. The RFID tag of claim 5, wherein the magnetic field concentration element is ferromagnetic.

7. The RFID tag of claim 5, wherein the magnetic field concentration element comprises iron.

8. The RFID tag of claim 5, further comprising a magnetically anisotropic material comprising an anisotropy axis perpendicular to a surface of the RFID tag.

9. A radio frequency identification (RFID) tag, comprising:
   a substrate; and
   a first inductive-capacitive circuit, located on the substrate, comprising:
      a first inductive antenna to communicate with a RFID interrogator using a radio frequency signal; and
      a first capacitor coupled to the first inductive antenna; and
   a second inductive-capacitive circuit, located on the substrate, comprising:
      a second inductive antenna that provides a radiated signal; and
      a second capacitor coupled to the second inductive antenna, wherein the first and second inductive-capacitive circuits are cross-coupled by a parameter-sensitive interaction region, causing the radiated signal to depend at least in part on a sensed parameter.

10. The RFID tag of claim 9, wherein the cross-coupling is provided by an interaction region that lies between the first capacitor and the second capacitor.

11. The RFID tag of claim 9, wherein the cross-coupling is provided by an interaction region that lies between the first inductive antenna and the second inductive antenna.

12. The RFID tag of claim 9, wherein the cross-coupling is provided by an interaction region that lies both between the first inductive antenna and the second inductive antenna and between the first capacitor and the second capacitor.

13. The RFID tag of claim 9, wherein the first inductive-capacitive circuit is positioned on a first side of a substrate, and the second inductive-capacitive circuit is positioned on a second side of the substrate.

14. The RFID tag of claim 9, wherein the first inductive-capacitive circuit and the second inductive-capacitive circuit are positioned adjacently on a substrate.

15. The RFID tag of claim 9, wherein the first inductive-capacitive circuit is nested within the second inductive-capacitive circuit.

16. The RFID tag of claim 15, wherein the cross-coupling broadens a frequency band in which the tag responds to the RFID interrogator.

17. The RFID tag of claim 15, wherein the parameter is selected from the group consisting of temperature, pressure, salinity, pH, and chemical concentration.

18. The RFID tag of claim 9, further comprising one or more magnetic field concentration elements, located on the substrate, that concentrate a magnetic field toward the first inductive antenna and second inductive antenna.

* * * * *